United States Patent
Bhaskar et al.

(10) Patent No.: US 10,686,867 B2
(45) Date of Patent: Jun. 16, 2020

(54) SCALED IN-ORDER RECORD INPUT INGESTION FOR FILE-BASED STREAMS IN MULTI-THREADED ENVIRONMENTS

(71) Applicants: Priyanka Bhaskar, New Delhi (IN); Sucheta Dahiya, Faridabad (IN); Pragati Kumar Dhingra, New Delhi (IN); Mohit Gupta, Ghaziabad (IN); Devang Sethi, Punjab (IN)

(72) Inventors: Priyanka Bhaskar, New Delhi (IN); Sucheta Dahiya, Faridabad (IN); Pragati Kumar Dhingra, New Delhi (IN); Mohit Gupta, Ghaziabad (IN); Devang Sethi, Punjab (IN)

(73) Assignee: GUAVUS, INC., San Mateo, CA (US)

( * ) Notice: Subject to any disclaimer, the term of this patent is extended or adjusted under 35 U.S.C. 154(b) by 289 days.

(21) Appl. No.: 15/593,791

(22) Filed: May 12, 2017

(65) Prior Publication Data
US 2018/0332100 A1 Nov. 15, 2018

(51) Int. Cl.
*H04L 29/08* (2006.01)
*H04L 29/06* (2006.01)

(52) U.S. Cl.
CPC .......... *H04L 67/06* (2013.01); *H04L 67/2833* (2013.01); *H04L 69/22* (2013.01)

(58) Field of Classification Search
CPC ...... H04L 67/06; H04L 69/22; H04L 67/2833
See application file for complete search history.

(56) References Cited

U.S. PATENT DOCUMENTS

| | | | |
|---|---|---|---|
| 6,530,008 B1 * | 3/2003 | Lin | G06F 16/21 711/171 |
| 6,862,298 B1 * | 3/2005 | Smith | H04J 3/0632 370/235 |
| 2005/0066095 A1 * | 3/2005 | Mullick | G06F 16/1774 710/200 |
| 2006/0013566 A1 * | 1/2006 | Nakamura | G11B 27/034 386/240 |
| 2006/0072578 A1 * | 4/2006 | Alfano | H04J 3/0685 370/394 |
| 2009/0031292 A1 * | 1/2009 | Fulton | G06F 9/4493 717/151 |
| 2010/0313205 A1 * | 12/2010 | Shao | H04L 41/142 718/105 |
| 2010/0329141 A1 * | 12/2010 | Apostol | H04L 47/22 370/252 |
| 2011/0158612 A1 * | 6/2011 | Takeda | H04N 9/8211 386/338 |
| 2013/0031567 A1 * | 1/2013 | Nano | G05B 21/02 719/318 |
| 2013/0091181 A1 * | 4/2013 | Arenswald | G06F 16/2443 707/803 |

(Continued)

*Primary Examiner* — Philip J Chea
*Assistant Examiner* — Wuji Chen
(74) *Attorney, Agent, or Firm* — Morgan, Lewis & Bockius LLP

(57) ABSTRACT

In various embodiments, streaming data records, files or file segments transmitted from multiple resources in a multi-threaded environment are sorted into one or more time windows via use of one or more execution threads; the records, files or file segments in each time window are displayed, analyzed or delivered to various applications or destinations.

11 Claims, 8 Drawing Sheets

(56) References Cited

U.S. PATENT DOCUMENTS

| | | | |
|---|---|---|---|
| 2013/0219446 A1* | 8/2013 | Hefeeda | H04L 65/605 |
| | | | 725/116 |
| 2013/0265883 A1* | 10/2013 | Henry | H04L 43/0876 |
| | | | 370/241 |
| 2015/0110204 A1* | 4/2015 | Sun | H04N 17/004 |
| | | | 375/240.26 |
| 2017/0201560 A1* | 7/2017 | Imoto | H04N 21/4126 |

* cited by examiner

SCALED IN-ORDER RECORD INPUT INGESTION FOR FILE-BASED STREAMS IN MULTI-THREADED ENVIRONMENTS

TECHNICAL FIELD

In various embodiments, the present invention relates generally to communications over telecommunication and computer networks (collectively, "networks"), and in particular to ordering file-based streams in multi-threaded environments.

BACKGROUND

"Streaming" involves transmitting data over a network as a steady, continuous flow, allowing playback to proceed as new data is received. A wide variety of data may be streamed—e.g., audio and video files, downloadable e-commerce purchases, in-game player activities, information from social networks, and telemetry from connected devices or instrumentation in data centers. Streaming data is beneficial in most scenarios where new, dynamic data is continually generated. For example, event stream processing in applications, such as network monitoring, e-business, health care, financial analysis and security supervision allows enterprises to react to changing business conditions in real time; streaming audio and video, on the other hand, provide real-time entertainment accessibility to a worldwide audience. Accordingly, streaming data has been a principal driving force in the continued development and exploitation of the Internet.

Streaming data may be generated continuously by multiple data sources, which typically transmit units of data (records) in small sizes (e.g., kilobytes) simultaneously. Upon arrival, these data records need to be processed sequentially and incrementally based on their inherent order on a record-by-record basis. However, because each data record may experience a different transmission delay (due to network traffic or possible node failure), the data records may arrive out-of-order at the destination—i.e., a data record transmitted earlier from a data source arrives at the destination later, while a data record transmitted later from the source arrives at the destination earlier. Managing out-of-order data arrival records is handled by network protocols such as TCP (transmission control protocol), which work well when all the data originates from a single source. Multi-threaded environments, in which related records originate with different sources or records originating with a single source are destined for different applications, pose a much greater challenge, particularly as the number of data sources or applications increases. Furthermore, protocols such as TCP operate at the packet level. If the transmission is organized at a different level (e.g., complete files or subpacket units such as pixels), such protocols cannot be used.

Accordingly, there is a need for an approach that can handle out-of-order data arrival and provide high scalability to accommodate large numbers of data resources in multi-threaded environments.

SUMMARY

Embodiments of the present invention include approaches that allow data transmitted in arbitrary but consistent "chunks" or records from multiple sources to be aggregated and/or delivered to various applications or destinations while maintaining the order of the transmitted data. In accordance with embodiments of the invention, stream data records transmitted from the sources are first aggregated into one or more files in a network node (e.g., an exporter) in accordance with source addresses, destination addresses, and/or timestamps and/or identification tags that specify an order among the received records. For example, data records originating from the same source and having the same destination may be ordered based on the timestamps; the ordered records are subsequently aggregated into a single file. The exporter may transmit the file to a data-collection node (or a collector) for display, analysis and/or allocation to various applications or destinations. If, however, the size of the file is too large (e.g., a megabyte), the exporter may divide the generated file into multiple file segments prior to outputting them. As used herein, a file refers to a data entity, such as an image, a page, a document, a video, a portion of a voice call, etc.; a file segment (or segment) refers to a part of a file transmitted as a unit, alone or with other segment(s) as a batch. Each file segment may include one or multiple records. A record generally corresponds to a unit of data transmission that is smaller than that of a file or a segment; for example, a record may be a pixel of an image file, a letter of a text file, a page of a documentary file, an image of a video file, etc. For example, a record may be the smallest "atomic" unit for a particular type of file.

In various embodiments, the exporter includes timestamp information in each file or segment prior to transmitting the file/segment to the collector. In one implementation, the collector is configured to accept certain files or file types or formats using, for example, a regular expression (regex). The accepted files/segments may be read by one or more threads (i.e., separate but concurrently executing computational processes), and based on the read information (e.g., timestamps) sorted into one or more series of ordered buckets. Each bucket is defined by a temporal interval (i.e., a time window) having a start time and an end time; thus, the size of each bucket corresponds to the amount of data transmitted during the time slice extending from the bucket start time to the bucket end time. In addition, the buckets are ordered based on their start times and end times. Typically, each file/segment is also defined, at least in part, by start and end times; thus, files/segments with start and end times within the start and end times of a particular bucket may be placed easily and straightforwardly into that bucket. Other files/segments, however, may be too large to fit entirely within a single bucket and may thus span or overlap multiple buckets. In accordance with embodiments of the invention, such files or segments are "prorated," i.e., divided into partial files or segments that each fit within one of the buckets that the files or segments overlap.

Once the files/segments or partial files/segments are placed into the buckets in order—i.e., files/segments having earlier timestamps (or earlier start and end times) are placed into buckets having earlier start and end times—the collector may sequentially process each bucket in accordance with its order to aggregate files/segments (and thus their records) therein. In one embodiment, the files/segments in each bucket are read by one or more execution threads and the aggregation is performed based on the read information (e.g., timestamps) associated with the files/segments or the records contained therein. In some embodiments, the collector further analyzes the data in the aggregated files/segments/records in each bucket to ensure in-order aggregation. For example, the collector may read the data of the files/segments/records using one or more threads to validate their read eligibility. Because the files/segments are placed into the ordered buckets based on their timestamps, analysis and validation of the file/segment data bucket-by-bucket may ensure correct ordering of the files/segments within each bucket and between different buckets. The files/segments in each bucket may then be aggregated, displayed, analyzed, and/or routed to various destinations or applications in accordance with the destination information embedded in the records aggregated in the files/segments.

Because the present invention utilizes threads to read data in the files/segments placed in each bucket, increasing numbers of data files/segments can be accommodated by simply increasing the thread count. Accordingly, the present invention also provides sufficient scalability to accommodate a growing amount of streaming data records/files/segments transmitted in a multi-threaded environment. In some embodiments, the thread count of the employed threads is less than the number of files/segments in each bucket. This way, each thread is guaranteed to read at least one of the files/segments and no thread idles.

In some embodiments, a "record" corresponds to a collection of packets of network stream observed and/or aggregated during a particular time interval and that may share one or more common properties, e.g., source, destination, protocol, packet header field(s), port number, packet contents, metadata, etc. (As used herein, the term "packet" can refer to an IP packet, a data frame, or any other data aggregation transmitted pursuant to a network protocol.) In an exemplary embodiment, records and/or files to be stored, prorated, and/or analyzed may include network stream flows from network appliances such as routers, probes, and other devices that are used by mediation systems, accounting/billing systems and network management systems. For example, records in embodiments of the invention may be stream flows generated and monitored in accordance with deep packet inspection (DPI), Internet Protocol Flow Information Export (IPFIX), and/or NetFlow protocols. Records may arise and be exported from various systems that are spread across large geographic distances, and the records may be aggregated into files by one or more network nodes or an exporter at significant data rates. In various embodiments, one or more edge-collection nodes in one or various remote locations receive and sort the input files or file segments into buckets. Each of the buckets may contain and/or store file segments from many different exporters, and file segments may be prorated into partial file segments that are each placed in a different bucket.

Various steps of techniques detailed herein may be performed by computational devices (e.g., computers and/or network appliances) and/or computer-implemented modules that may include or consist essentially of hardware and/or software. For example, stream data records may be aggregated into files by an exporter, which then routs the files or segments to a collector for display or analysis. The collector may also be utilized to partial files/segments and/or aggregate files/segments, and further analysis of data in the files/segments may be performed by the collector and/or a different computational node in the network to validate read eligibility of the data in the aggregated files/segments.

Accordingly, in one aspect, the invention pertains to a computer-implemented method of aggregating and ordering a collection of streaming file segments, each segment having multiple records received at a data rate over time. In various embodiments, the method includes (a) defining multiple time windows for placing the streaming file segments therein, each time window being defined by a start time and an end time and having a storage size determined by the start time, the end time, and the data rate; (b) receiving the collection of streaming file segments each having one or more timing parameters; and (c) acquiring the timing parameter(s) associated with each streaming file segment and, based thereon, assigning each of the streaming file segments to one or more time windows, thereby ensuring in-order assignment of the streaming file segments.

In various embodiments, the method includes (d) acquiring timestamp information from the streaming file segments in the first one of the time windows; and (e) time ordering the records of the streaming file segments in the first one of the time windows based at least in part on the acquired timestamp information. In addition, the method may further include subsequently repeating steps (c)-(e) for the second one of the time windows. The timestamp information of the streaming file segments may include a timestamp associated with each file segment and/or a timestamp associated with each record in each file segment. In some embodiments, the method further includes acquiring data of each record in each file segment. In addition, the method may include analyzing and validating read eligibility of the acquired data based at least in part on the timestamp associated therewith. In one implementation, the method includes determining a sync-wait time; the read eligibility of the acquired data records is validated based at least in part on the sync-wait time.

In some embodiments, the method further includes ordering the time windows based on the start time and/or the end time associated therewith. In addition, the method may include chronologically sorting the streaming file segments based on the acquired timing parameter(s) and assigning the sorted streaming file segments into the ordered time windows. The timing parameter(s) may be a timestamp, a start time and/or an end time associated with the streaming file segment. In addition, the timing parameter(s) may be acquired using an execution thread reading the streaming file segments.

Further, the method may include displaying the streaming file segments, analyzing the streaming file segments, or routing the streaming file segments to various destinations or applications. In some embodiments, the method includes receiving the second collection of streaming file segments; and assigning one or more second collections of streaming file segments to the second one of the time windows. In one implementation, the method further includes, prior to assigning each of the streaming file segments to the time window(s), determining whether the streaming file segment has a size larger than the storage size of the time window; and if so, prorating the streaming file segment.

In another aspect, the invention relates to a system for aggregating and ordering a collection of streaming file segments, each segment having multiple records received at a data rate over time. In various embodiments, the system includes a memory defining multiple time windows for placing the streaming file segments therein, each time window being defined by a start time and an end time and having a storage size determined by the start time, the end time, and the data rate; and a collector for receiving, reading, sorting, aggregating, and analyzing the streaming file segments. In one implementation, the collector is configured to (a) receive the collection of streaming file segments each having one or more timing parameters; and (b) acquire the timing parameter(s) associated with each streaming file segment and, based thereon, assign each of the streaming file segments to one or more time windows, thereby ensuring in-order assignment of the streaming file segments. In addition, the system may further include an exporter configured to (i) assemble the records into one or more streaming file segments and (ii) export the streaming file segment(s) to the collector.

In various embodiments, the collector is configured to: (d) acquire timestamp information from the streaming file segments in the first one of the time windows; and (e) time order the records of the streaming file segments in the first one of the time windows based at least in part on the acquired timestamp information. The collector may be further configured to subsequently repeat steps (c)-(e) for the second one of the time windows. The timestamp information of the streaming file segments may include a timestamp associated with each file segment and/or a timestamp associated with each record in each file segment. In addition, the collector may be configured to acquire data of each record in each file segment. In some embodiments, the collector is further configured to analyze and validate read eligibility of the acquired data based at least in part on the timestamp associated therewith. In addition, the collector may be configured to determine a sync-wait time; the read eligibility of the acquired data records is validated based at least in part on the sync-wait time.

In various embodiments, the collector is further configured to order the time windows based on the start time and/or the end time associated therewith. In addition, the collector may be configured to chronologically sort the streaming file segments based on the acquired timing parameter(s) and assign the sorted streaming file segments into the ordered time windows. The timing parameter(s) may be a timestamp, a start time and/or an end time associated with the streaming file segment. In addition, the timing parameter(s) may be acquired using an execution thread reading the streaming file segments.

The collector may be further configured to display the streaming file segments, analyze the streaming file segments, or route the streaming file segments to various destinations or applications. In some embodiments, the collector is configured to receive the second collection of streaming file segments; and assign one or more second collections of streaming file segments to the second one of the time windows. In one implementation, the collector is further configured to, prior to assigning each of the streaming file segments to the time windows, determine whether the streaming file segment has a size larger than the storage size of the time window; and if so, prorate the streaming file segment.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DESCRIPTION

Embodiments of the present invention relate to sorting and aggregating stream records, files and/or file segments in order—i.e., based on their associated timestamps, and subsequently processing, displaying or analyzing the in-order files/segments or routing them to various destinations or applications. For example, in-order aggregated stream files may be displayed by a suitable client-side player. Alternatively, the in-order aggregated stream files may be analyzed for the purpose of, for example, network health monitoring, metering, and control.

Figure 1:
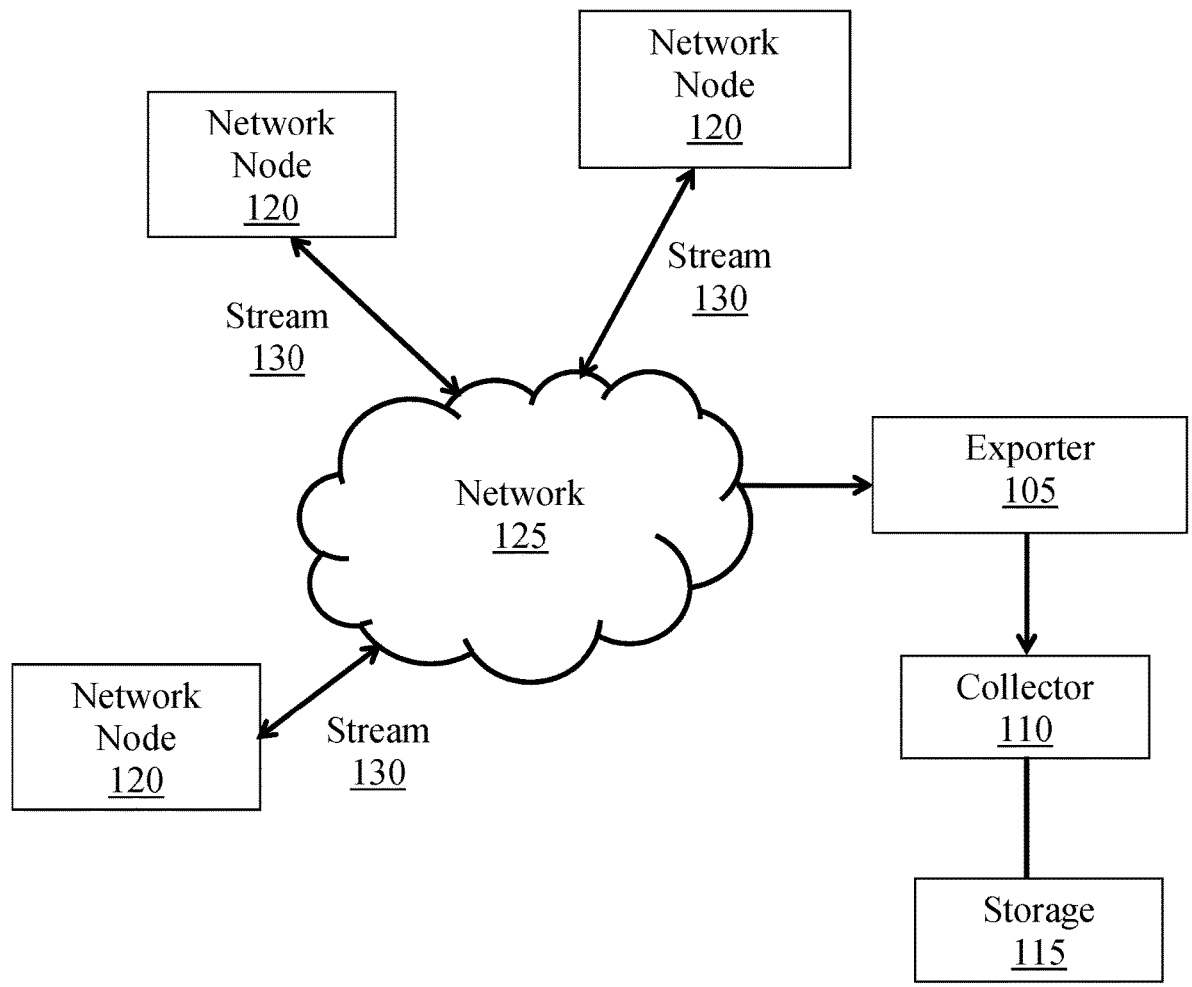
FIG. 1 is a block diagram of a network system in accordance with various embodiments of the present invention.

FIG. 1 depicts an exemplary streaming network system 100 in accordance with various embodiments of the invention including an exporter 105, a collector 110, and a storage (or "memory") 115. These modules, which may be realized in hardware, software or a combination, are connected to one or more network nodes 120 via a computer network 125. Each of the nodes 120 may include or consist essentially of any device deployed in computer network 125 that can control access to and use of the resources of the computer network 125. For example, a node 120 may include or consist essentially of a network appliance such as a router, gateway, switch, hub, networking server, bridge, interface controller, wireless access point, or firewall, or a computing device such as a server, a workstation, a terminal, a desktop computer, a laptop computer, a cellular phone, or a tablet computer, or any other type of device with suitable ingress and egress ports. Each node 120 may even represent another network (e.g., a LAN or WAN) containing multiple network nodes. The exporter 105 and collector 110 may include or consist essentially of a computing device, e.g., a server, which executes various program modules to perform methods in accordance with embodiments of the present invention. The memory 115 may include or consist essentially of one or more volatile or non-volatile storage devices, e.g., random-access memory (RAM) devices such as DRAM, SRAM, etc., read-only memory (ROM) devices, magnetic disks, optical disks, flash memory devices, and/or other solid-state memory devices. All or a portion of the memory 115 may be located remotely from the collector 110 and/or the exporter 105, e.g., one or more storage devices connected to collector 110 via network 125 or another network. As utilized herein, the term "electronic storage" (or simply "storage") broadly connotes any form of digital storage, e.g., optical storage, magnetic storage, semiconductor storage, etc. Furthermore, a record or partial record may be "stored"

via storage of the record or partial record itself, a copy of the record or partial record, a pointer to the record or partial record, or an identifier associated with the record or partial record, etc. In various embodiments, system 100 may include multiple exporters 105 and/or multiple collectors 110, and a single exporter 105 may export records to multiple collectors 110, and a single collector 110 may receive records from multiple exporters 105.

In accordance with embodiments of the invention, data originating from one or more of the network nodes 120 and/or being transmitted over network 125 are aggregated into files by the exporter 105. The exporter 105 may be configured to monitor overall traffic from a network or subnetwork. In addition, the exporter 105 may be configured to ingest flows originating from a designated source, group of sources, subnetwork, or network. In a multi-threaded environment, the nodes 120 may transmit continuous network flows or data streams 130 in small (on the order of kilobytes) records to the exporter 105. In some embodiments, each data record in the stream includes a source address, a destination address, and a timestamp that allows the records upon arrival at the exporter 105 to be aggregated sequentially and incrementally on a record-by-record basis in accordance with their timestamps, originated sources, and/or destinations. For example, the exporter 105 may aggregate a collection of the records originated from the same source and destined to the same application into one or more files; the file(s) may be in any type of format over a specific period of time. Depending on the size of the file, the exporter may or may not divide the file into multiple segments prior to exporting it to the collector 110. Each file/segment has a start time and an end time, and hence the size of the file/segment extends from the start time to the end time. In addition, based on the time of collection, the exporter 105 may create a timestamp (and/or a start time and end time) associated with each file/segment; the timestamp information may be embedded in a filename and/or a file-creation time of each file/segment. The files/segments may then be exported to the collector 110. The exporter 105 may be a standalone device discrete from the collector 110, or alternatively, the exporter 105 and the collector 110 may represent different functionalities of a common computing device.

Figure 2A:
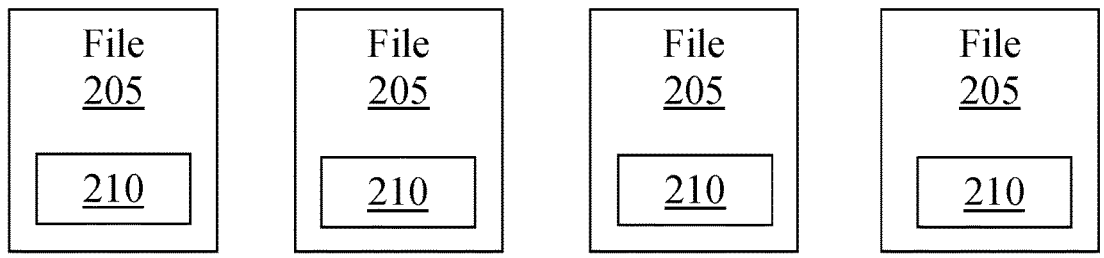
FIG. 2A is a schematic diagram illustrating aggregation of exemplary received streaming data records into one or more files and definition of time windows in accordance with various embodiments.
Figure 2A:
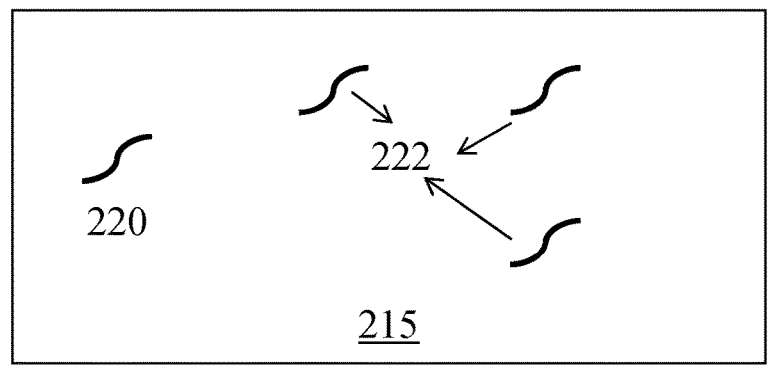
Figure 2A:
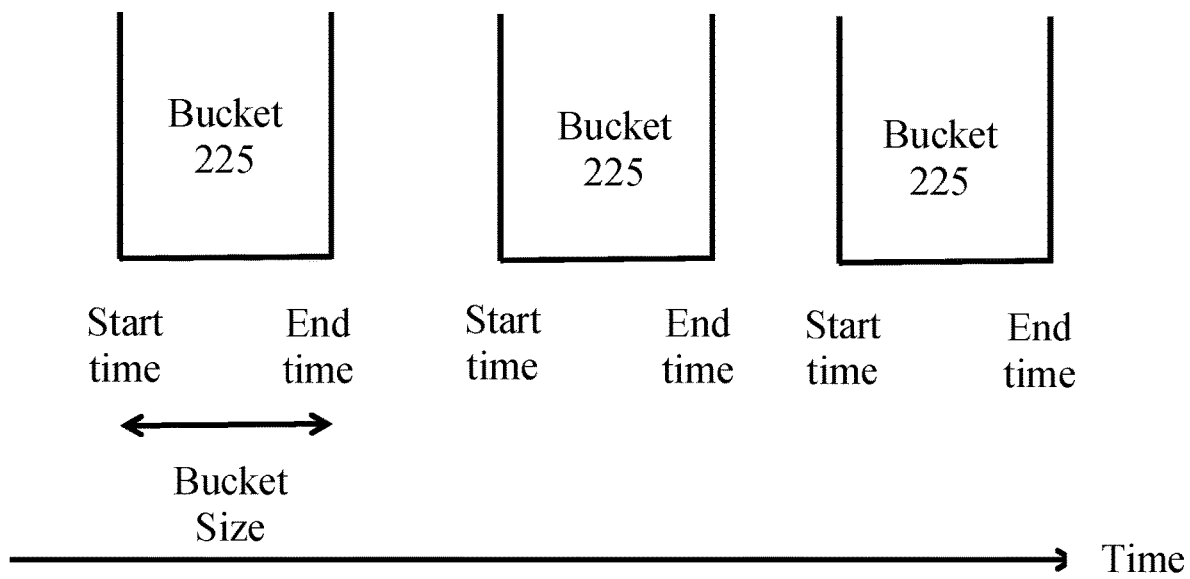

In various embodiments, the collector 110 is configured to accept certain files or certain types or formats of files exported from the exporter 105. For example, the collector 110 may employ a regular expression ("regex") defining the files/segments to be accepted; the regex may be configured based on a network operator's instructions. The accepted files/segments may then be sorted, prorated and/or stored by the collector 110 as detailed further below. For example, referring to FIG. 2A, the collector 110 may sort the accepted files/segments 205 based on their timestamp information 210 created by the exporter 105. In various embodiments, the timestamp information is acquired using a thread pool 215 having multiple execution threads that read data from incoming input files/segments. For example, the pool 215 may include one (and, in some embodiments, only one) primary thread 220 for acquiring the timestamp 210 associated with each accepted file/segment 205 from the filename and/or file-creation time of each accepted file/segment. Based on the read timestamps 210, the primary thread 220 may list the files/segments in a chronological order and sort them into a series of buckets 225 as further described below.

In various embodiments, the collector 110 defines the buckets 225 within the memory 115 (e.g., as partitions of RAM, disk, etc.) for the storage of files and prorated files as detailed below. For example, the buckets 225 may be logical memory partitions or, in some embodiments, may correspond to different banks of memory or different storage devices. In various embodiments, each of the defined buckets 225 has a start time and an end time that can define a time window (e.g., a bucket having a start time of is and a stop time of 4 s has a time window of 3 s); thus, the size of the bucket is defined temporally to extend from the start time to the end time and, at a given data rate, represents the maximum size of a file, segment, partial file, partial segments, multiple segments, or multiple files that may be stored within the bucket. In various embodiments of the invention, each of the defined buckets has the same bucket size, but in other embodiments two or more of the buckets have different sizes.

Figure 2B:
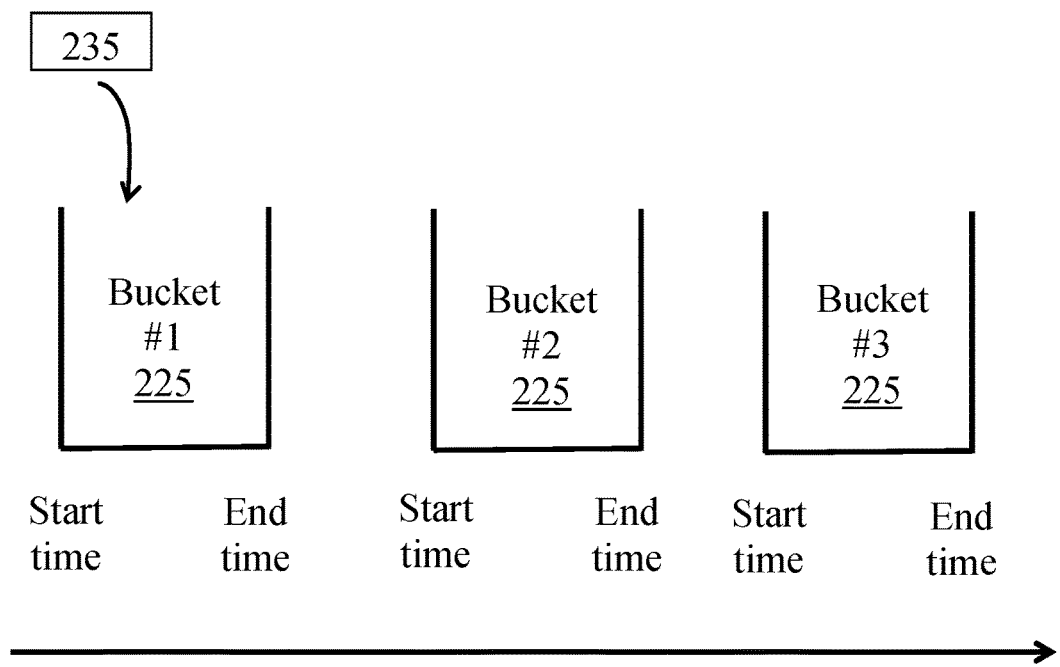
FIGS. 2B-2G are schematic diagrams of the allocation and proration of files or file segments in accordance with various embodiments.
Figure 2C:
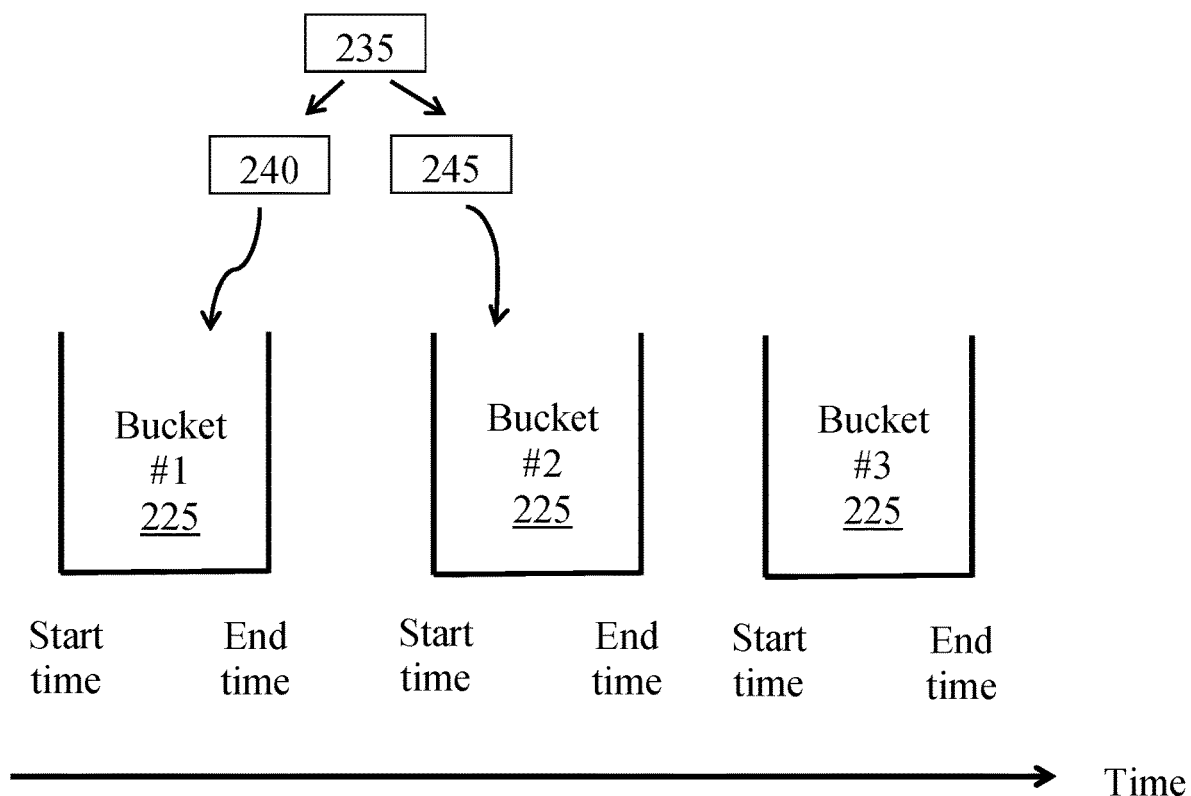

FIGS. 2B and 2C depict exemplary buckets 225 in accordance with embodiments of the present invention. In one example, the buckets 225 are numbered and ordered based on their start times and end times. Each bucket can have a time window equal to a difference between an end time and start time associated with the bucket. The files/segments sorted by the primary thread 220 are sequentially placed into the ordered buckets. For example, the file/segment 235 having the earliest timestamp among the currently received incoming files/segments (and therefore listed as the first file/segment on a chronological list) is first placed into the first bucket having the earliest start time (FIG. 2B). If the first file/segment 235 falls within a single bucket, i.e., if the file/segment size is equal to or smaller than the bucket size, then the file/segment needs no proration. If, however, the size of the file/segment is larger than the bucket size, the file/segment may span multiple buckets, and thus need to be prorated (i.e., divided) into partial files/segments with each partial file/segment spanning only one of the buckets for placement therein. For example, referring to FIG. 2C, the first file/segment 235 may be prorated into two prorated files/segments 240, 245 with the prorated file/segment 240 placed into the first bucket and the prorated file/segment 245 placed into the second bucket.

Figure 2D:
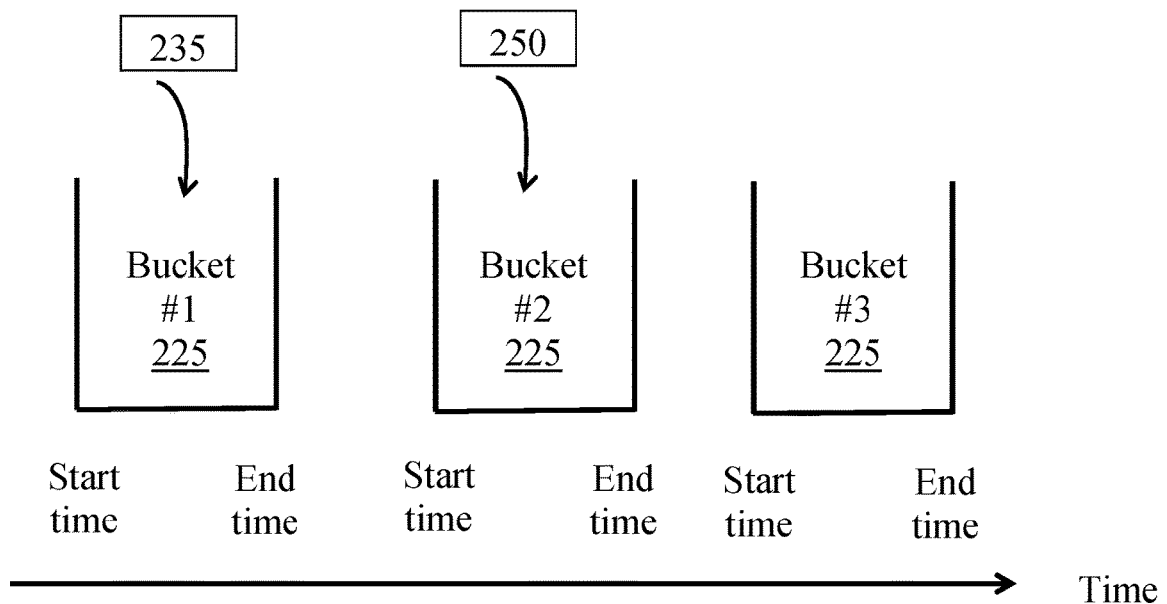
Figure 2E:
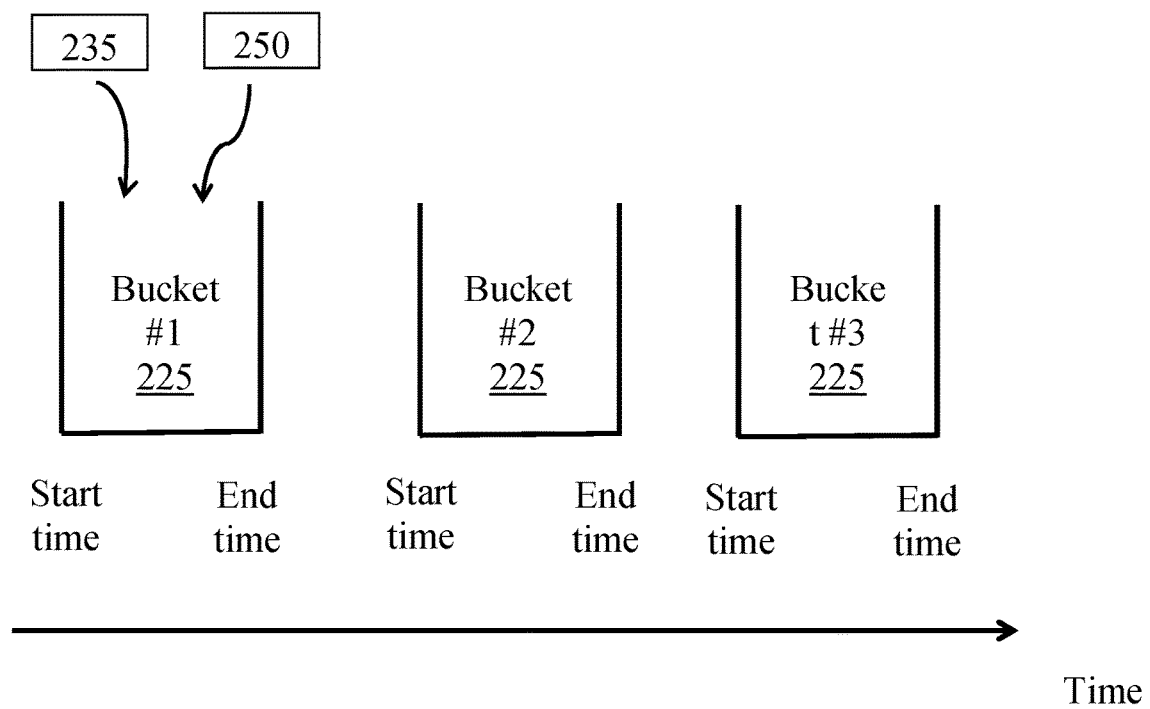
Figure 2F:
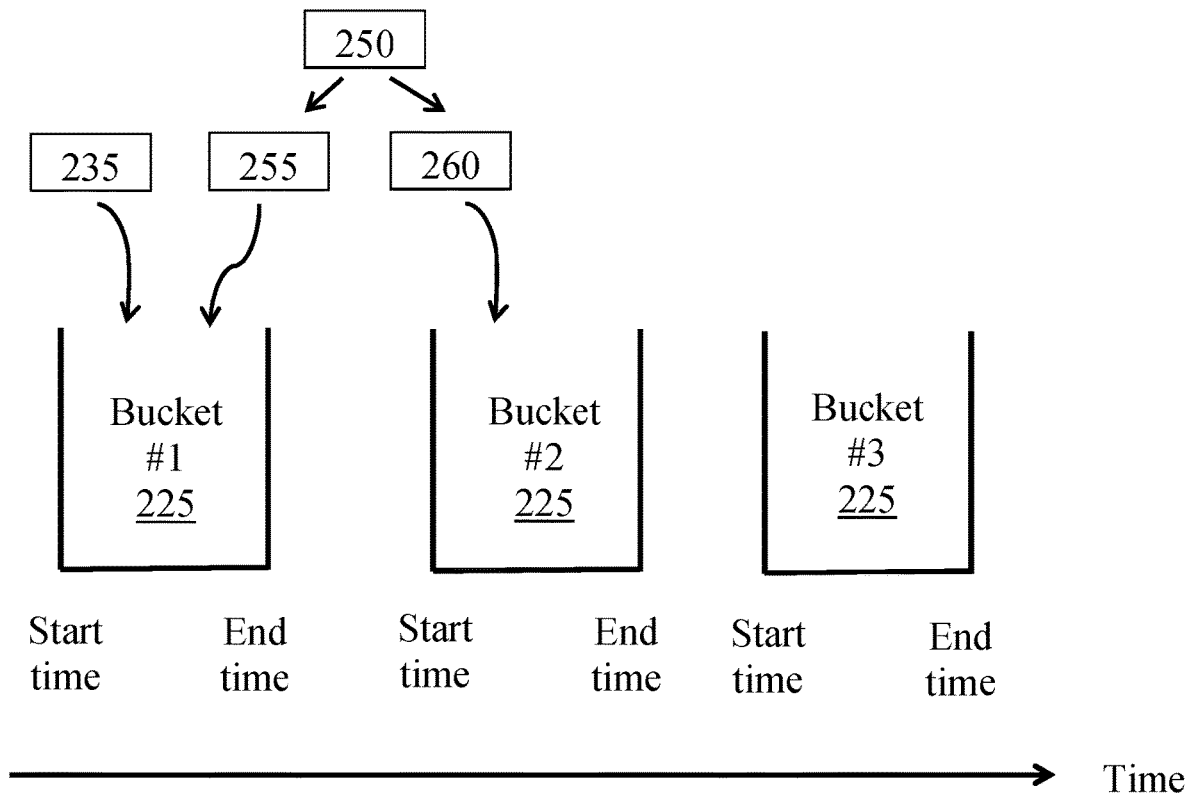

Referring to FIG. 2D, in various embodiments, the second file/segment 250, which has the second earliest timestamp, is subsequently placed into the next unoccupied bucket. Again, the second file/segment 250 may or may not need to be prorated, depending on the size thereof. Referring to FIG. 2E, the second file/segment 250 may be allocated into the first bucket if the time window of the first bucket is equal to or larger than the combined size of the first file/segment 235 and the second file/segment 250. For example, if the first bucket has a time window of 10 s, and the combined size of the first file/segment 235 and the second file/segment 250 corresponds to 8 s of transmission at the operative data rate, both files/segments can be placed in the first bucket. If, however, the time window of the first bucket is smaller than the combined size of the first file/segment 235 and the second file/segment 250, the second file/segment 250 may be placed into the second bucket as depicted in FIG. 2D. Alternatively, the second file/segment 250 may be prorated into two prorated files/segments 255, 260 with the prorated file/segment 255 placed into the first bucket and the prorated file/segment 260 placed into the second bucket (FIG. 2F). This approach may allow the collector 110 to aggregate and/or analyze data in the files/segments on a bucket-by-bucket basis at a later time.

Figure 2G:
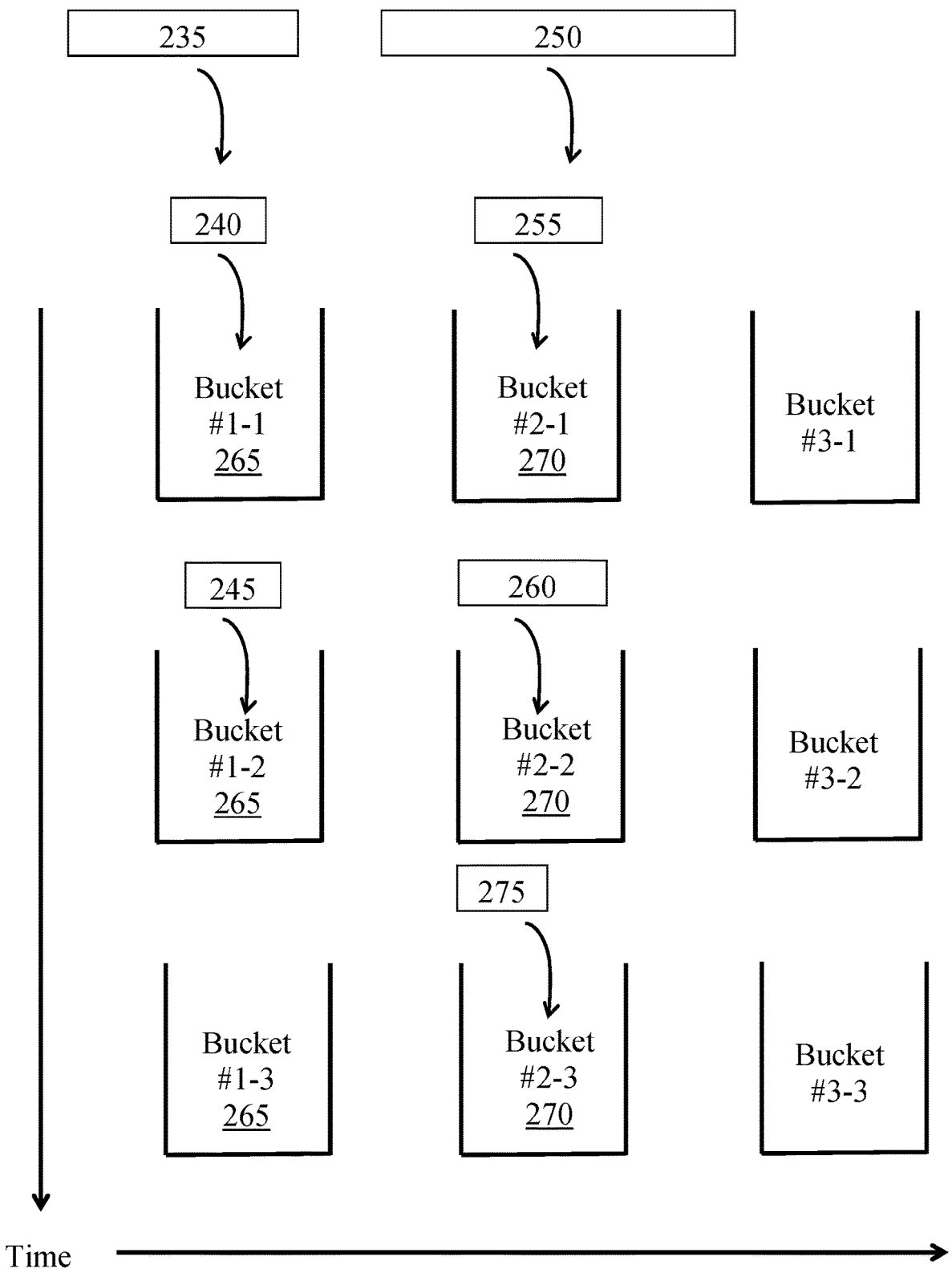

In some embodiments, each file/segment has its own series of buckets. For example, referring to FIG. 2G, the first file/segment 235 and second file/segment 250 may have their own series of buckets 265 and 270, respectively. After the first file/segment 235 (or prorated files/segments) is placed into its associated first series of bucket(s) 266, the collector 110 may place the second file/segment 250 into the second series of bucket(s) 270 regardless of the availability in the first series of buckets 265. Again, if the size of the second file/segment 250 is larger than the capacity of the bucket, the collector 110 may prorate the second file/segment 240 into multiple partial files 255, 260, 275 and place the prorated files/segments into corresponding buckets.

Referring again to FIG. 2A, in various embodiments, the thread pool 215 further includes one or more secondary threads 222 that read the data of the files/segments allocated in each bucket for validating read eligibility thereof. The thread-reading process may be performed in accordance with the order of the buckets. For example, the primary thread may be executed to first read files/segments in the first bucket in order to acquire the timestamp associated with each file/segment and/or timestamp associated with each data record in each file/segment. In addition, one or more secondary threads 222 may be executed to read the data, such as a letter, a text and/or a pixel value, associated with each record in the files/segments. Each secondary thread 222 may read one or more files/segments. In addition, each file/segment may be read by one or more secondary threads 222. In various embodiments, the collector 110 introduces a sync-wait time during the data-reading process; the sync-wait times is a time delay ensuring that a file or a file segment being copied is not read while writing is still in progress. Accordingly, based on the read information, including the timestamps associated with the files/segments, the timestamps associated with the records of each files/segment and the obtained data of the files/segments, and the introduced sync-wait time, the data in the first bucket may be ordered, assembled and analyzed to determine its read eligibility. In a simplified example, a record corresponds to one pixel, a file corresponds to an image having 256×256 pixels, and a file segment corresponds to a sub-image having 256×16 pixels. The primary thread may read the timestamps associated with the records in the file segments as well as the timestamps associated with the file segments, and the secondary thread may read pixel values of the record in the file segments. Based on the timestamps of the records and the file segments, the collector 110 may reconstruct the 256×256 image. The collector 110 may then validate read eligibility of the image by, for example, analyzing the pixels values thereof. For example, if there is significant discontinuity in the pixel values between two neighboring pixels, it indicates that there is an ordering error.

In various embodiments, if the read eligibility is determined to be valid (e.g., the error rate is below a threshold, such as 5%), the collector 110 continuously executes the primary and secondary threads 222 to read the files/segments allocated in the next bucket (i.e., the second bucket in the manner as described above) to validate read eligibility of the files/segments therein. This process may be sequentially performed, based on the order of the buckets, throughout the entire collection of buckets. This approach is preferred when there is a significant backlog of incoming files/segments (e.g, more than 100 files/segment) waiting for sorting, which may result in a longer processing time for ordering the files/segments chronologically prior to placing them into corresponding buckets. If, however, the read eligibility is invalid (e.g., the error rate is above the threshold), the files/segments and/or records therein may be aggregated in an out-of-order manner. The collector 110 may re-execute the primary thread to re-sort the accepted files/segments, update their placement in the buckets, and re-validate the read eligibility of their data. In some embodiments, the collector 110 may display an error message to the network operator to indicate an out-of-order file/segment aggregation.

Alternatively, in various embodiments, after the read eligibility of the files/segments in the first bucket has been validated, the collector 110 may accept one or more new incoming files/segments as described above, and sort the newly accepted files/segments into the bucket(s) based on their associated timestamps. This process may ensure a fresh listing of files/segments in each bucket and may be suitable when there is no (or a limited) backlog of incoming files/segments. Finally, the files/segments whose aggregation order is verified in each bucket may be displayed and/or analyzed by the collector 110, and/or routed to various destinations or applications based on the destination addresses embedded in the records aggregated in the files/segments on a bucket-by-bucket basis.

As described above, because each data record in the streams includes a timestamp and the exporter 105 aggregates the records based on their timestamps into one or more files, the order of the aggregated records in each file is ensured to be consistent with their timestamps created by the originating nodes 120. In addition, incoming files/segments accepted by the collector 110 are first sorted by the primary thread based on the timestamps associated therewith and subsequently placed into a series of ordered buckets based on their sorted order, the order of the files/segments within each buckets and across different buckets is also ensured to be consistent with their timestamps created by the exporter 105. Accordingly, the current invention provides approaches that allow streaming data records received at the collector 110 to be aggregated and/or delivered in a correct order (i.e., consistent with the timestamps associated therewith). Finally, the order of the files/segments and their records in each bucket may be checked and confirmed by analyzing read eligibility of the data therein.

Further, as described above, the present invention utilizes one or more secondary threads 222 to read the data in the files/segments in each bucket. By increasing the thread count of the secondary threads 222, the of data files/segments that can be read is commensurately increased. Thus, this approach provides scalability for accommodating a growing amount of streaming data files/segments in multi-threaded environments. In some embodiments, the thread count of the secondary threads 222 is less than the number of files/segments allocated in each bucket. This way, each secondary thread 222 is ensured to read at least one of the files/segments and no secondary thread 222 idles.

Figure 3:
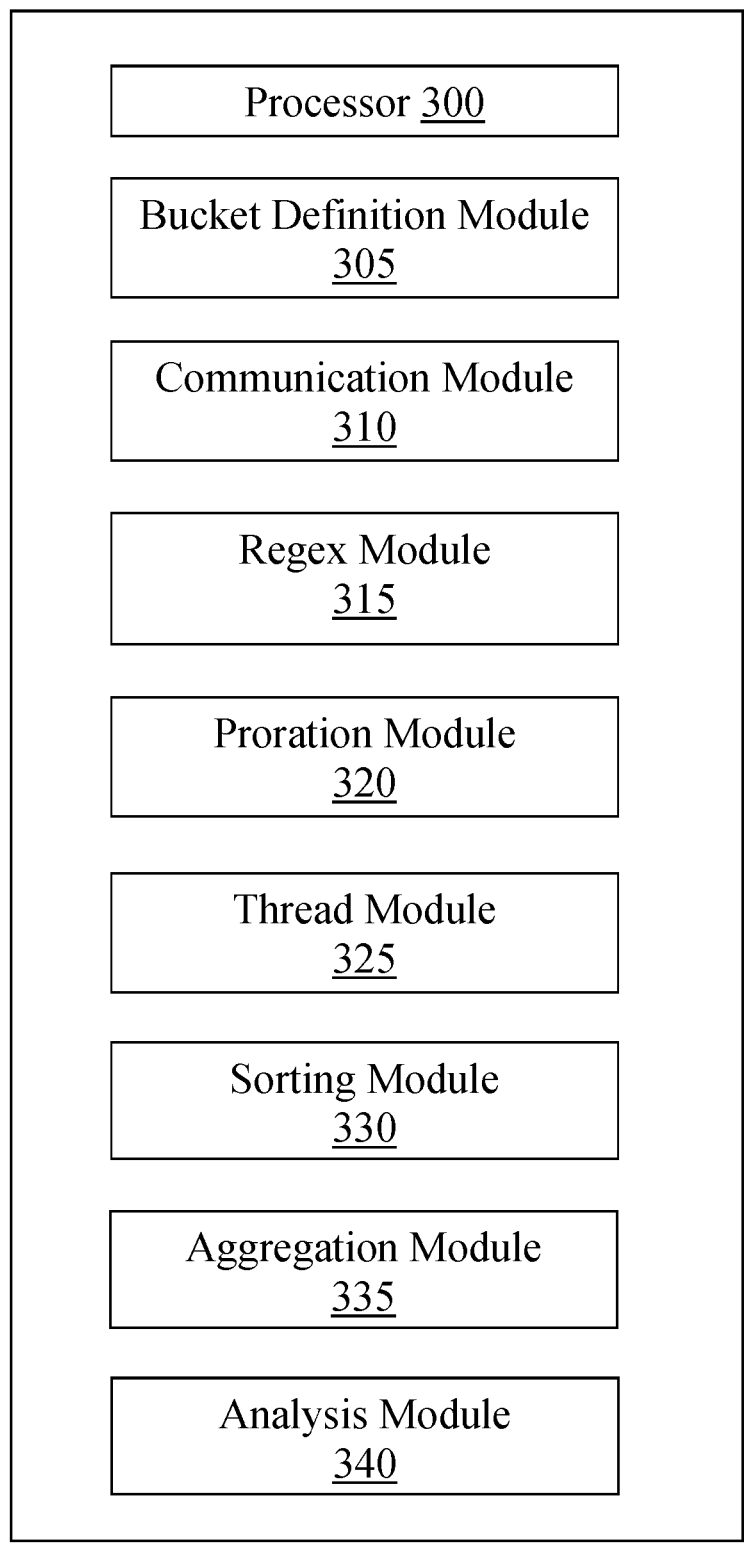
FIG. 3 is a block diagram of a collector for aggregating and/or delivering streaming data records ordered in accordance with various embodiments.

FIG. 3 is a schematic block diagram of a collector 110 in accordance with embodiments of the invention. As shown, the collector 110 may include a conventional computer processor 300 that executes or controls various modules (e.g., program modules and/or hardware modules) that perform various aspects of embodiments of the invention. For example, the collector 110 may include a bucket definition module 305 for the division of memory 115 (or a portion thereof) into multiple buckets for storage of files/segments and partial files/segment. The proration may be based on network traffic patterns affecting the exporter from which the files/segments are received or the nodes 120 from which streaming data records are received or on the nature and urgency of the analysis to be performed. If buckets are found to fill too quickly or unevenly, the number of buckets and their sizes may be adjusted dynamically.

The collector 110 may also include a communications module 310 for electronic communication with the exporter 105 and/or other nodes connected to network 125. The communications module 310 may thus include one or more communications interfaces such as wired and/or wireless network interfaces. The communications module 310 may also facilitate interaction with one or more users of system 100 that are local to or remotely positioned from the collector 110. Thus, the communications module 310 may also include, e.g., one or more input devices such as a keyboard, mouse or other pointing device, or microphone (for spoken input) and/or one or more output devices such as a display, printer, speaker, etc.

In various embodiments of the invention, the collector 110 also includes a regex module 315 for defining the files/segments or types or formats of files/segments to be accepted. In addition, the collector 110 includes a proration module 320 for the time-based division of files/segments into prorated (i.e., partial) files/segments, a thread module 325 for executing one or more execution threads in a thread pool so as to read information from the data records and/or files/segments, a sorting module 330 for sorting the received files/segments chronologically based on their timestamps and placing the sorted files/segments into the defined buckets, an aggregation module 335 for aggregating data records and/or files/segments placed in each bucket, and an analysis module 340 for analyzing data records and/or files/segments (such as validating read eligibility thereof) in each bucket. In various embodiments, the analysis module 340 is not a part of collector 110 and is instead a part of a dedicated device (e.g., a server or other computing device) interconnected to collector 110 and/or memory 115.

In various embodiments, once accepted by the collector 110, the streaming files/segments from the exporter 105 are sorted and stored in buckets and prorated into multiple buckets if necessary. As noted above, the term "store in" does not necessarily require physical storage of an entire file within a memory partition corresponding to a bucket. Rather, the files may be stored in a conventional buffer arrangement and the buckets may be database entries populated by pointers to the files or their constituent data records that have been assigned to the buckets.

Figure 4:
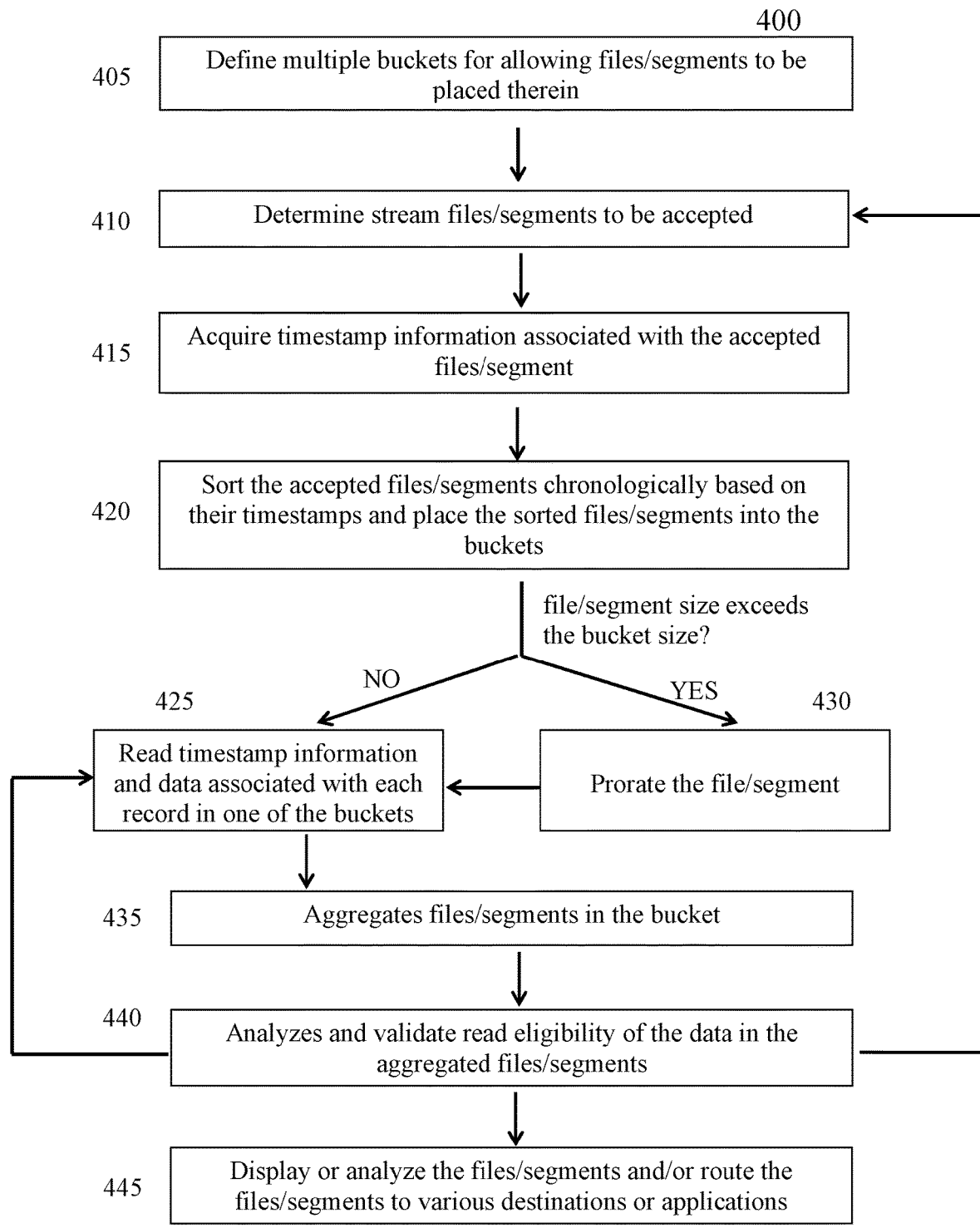
FIG. 4 is a flow chart illustrating approaches for aggregating and/or delivering streaming data records ordered in accordance with various embodiments.

FIG. 4 depicts an exemplary method 400 for aggregating and/or delivering received streaming data records ordered in accordance with embodiments of the present invention. While the various steps of method 400 are depicted as occurring in a particular order, the depicted order and the number and definition of the steps may be varied depending on the implementation. Other embodiments of the invention feature more or fewer steps and/or steps performed in a different order. As shown, in a first step 405, the collector 110, via the bucket definition module 305, defines multiple buckets for allowing time sorted files/segments to be placed therein. In typical embodiments, the buckets do not overlap each other in time; thus, in such embodiments each bucket has a unique start time and end time that collectively define the bucket size as a temporal interval (or a time window). In various embodiments, there are no gaps in time between the end time of one bucket and the start time of the next bucket. In addition, in various embodiments, the buckets defined in step 405 have substantially the same size; in other embodiments, the sizes of two or more of the buckets are different. In one implementation, the buckets are ordered based on their start times and end times. For example, the first bucket may include files/segments having the earliest timestamps, whereas the last bucket may include files/segments having the latest timestamps as describe above. In a second step 410, after bucket definition, the collector 110, via the regex module 315, determines the files/segments or the types or formats of the received stream files/segments exported from the exporter 105 to be accepted. In a third step 415, the collector 110, via the thread module 325, executes one or more primary threads in a thread pool to acquire timestamp information associated with the accepted files/segments. In a fourth step 420, the collector 110, via the sorting module 330, sorts the accepted files/segments chronologically in accordance with the timestamp information acquired in step 415 and places the sorted files/segments into the buckets defined in step 405. If the file/segment falls within a single bucket, i.e., if the time duration of the file/segment is equal to or less than a bucket's time window, then the file/segment needs no proration. Thus, in a fifth step 425, the collector 110, via the thread module 325, reads timestamp information and data associated with the records of the files/segments in one of the buckets (e.g., the first bucket). In some embodiments, one or more files/segments accepted by the collector 110 have sizes exceeding that of one or more of the buckets, and will therefore overlap or span multiple buckets. In cases in which an accepted file/segment overlaps multiple buckets, the file/segment may be prorated, via the proration module 320, in a step 430. In various embodiments, the file/segment is prorated by dividing the file/segment into two or more partial files/segments each of which fits within a single bucket. In a step 435, the collector 110, via the aggregation module 335, aggregates data records in the first bucket based on the timestamps associated therewith. In a step 440, the collector 110, via the analysis module 340, analyzes and validates read eligibility of the data in the aggregated records. In accordance with embodiments of the invention, steps 425, 435, 440 may be performed in the next bucket(s) in accordance with their order; this approach is preferred when the backlog of incoming files/segments from the exporter 105 is above a threshold (e.g, more than 100 files/segments) and a long time is required to sort the accepted files/segments. Alternatively, when there is no (or a limited) backlog of incoming files/segments, the collector 110 may accept one or more new incoming files/segments as described above in connection with step 410, sort and allocate the new accepted files/segments into the bucket(s) in accordance with steps 415-430, and finally aggregate the newly accepted files/segments with other files/segments in the bucket(s) for validating read eligibility as described in steps 430, 435. The aggregated files/segments in the bucket (s) may then be displayed, analyzed, and/or routed to various destinations or applications (in a step 445).

Various embodiments of the invention are implemented via a computer-based system that includes one or more computing devices (e.g., computers, servers, network appliances), each of which includes a processor and utilizes various program modules. Program modules may include or consist essentially of computer-executable instructions that are executed by a conventional computer or processing unit. Generally, program modules include routines, programs, objects, components, data structures, etc. that performs particular tasks or implement particular abstract data types.

Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Thus, systems in accordance with embodiments of the present invention may include or consist essentially of one or more general-purpose computing devices each in the form of a computer or network appliance including a processing unit (or "processor" or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). The system memory may also include locally or remotely hosted databases and/or other storage devices, e.g., a storage area network (SAN). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general-purpose processor, but may utilize any of a wide variety of other technologies including special-purpose hardware, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of embodiments of the invention.

Various components of systems in accordance with embodiments of the invention may be interconnected with each other and with other computers and/or network appliances (e.g., routers, switches, etc.) via a computer network. As used herein, a "computer network" or "network" is any wired and/or wireless configuration of intercommunicating computational nodes, including, without limitation, computers, switches, routers, firewalls, personal wireless devices, etc., and including local-area networks, wide-area networks, the Internet, cellular networks, satellite networks, and telecommunication and public telephone networks. Networks in accordance with embodiments of the present invention may be implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), time division multiple access (TDMA), Bluetooth, Wi-Fi, voice over internet protocol (VOIP), Wi-MAX, etc.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer-implemented method of aggregating and ordering a collection of streaming file segments, each segment comprising a plurality of records received at a data rate over time, the method comprising:
   (a) defining a plurality of time windows for placing the streaming file segments therein, each time window being defined by a start time and an end time and having a storage size determined by the start time, the end time, and the data rate;
   (b) receiving the collection of streaming file segments each having at least one timing parameter; and
   (c) acquiring the timing parameter associated with each streaming file segment and, based on the acquired timing parameter and the start times and end times of the plurality of time windows, assigning each of the streaming file segments to at least one of the time windows, thereby ensuring in-order assignment of the streaming file segments;

(d) acquiring timestamp information from the streaming file segments in a first one of the time windows, the timestamp information of the streaming file segments comprising at least one of a timestamp associated with each file segment or a timestamp associated with each record in each file segment;

(e) time ordering the records of the streaming file segments in the first one of the time windows based at least in part on the acquired timestamp information;

(f) acquiring data of each record in each file segment; and (g) analyzing and validating read eligibility of the acquired data based at least in part on the timestamp associated therewith and a maximum ordering error among pixels.

2. The method of claim 1, further comprising subsequently repeating steps (c)-(e) for a second one of the time windows.

3. The method of claim 1, further comprising determining a sync-wait time, wherein the read eligibility of the acquired data records is validated based at least in part on the sync-wait time.

4. The method of claim 1, further comprising ordering the time windows based on at least one of the start time or the end time associated therewith.

5. The method of claim 4, further comprising chronologically sorting the streaming file segments based on the acquired timing parameter and assigning the sorted streaming file segments into the ordered time windows.

6. A system for aggregating and ordering a collection of streaming file segments, each segment comprising a plurality of records received at a data rate overtime, the system comprising:

a memory defining a plurality of time windows for placing the streaming file segments therein, each time window being defined by a start time and an end time and having a storage size determined by the start time, the end time, and the data rate; and a collector for receiving, reading, sorting, aggregating, and analyzing the streaming file segments, the collector being configured to:

(a) receive the collection of streaming file segments each having at least one timing parameter;

(b) acquire the timing parameter associated with each streaming file segment and, based on the acquired timing parameter and the start times and end times of the plurality of time windows, assign each of the streaming file segments to at least one of the time windows, thereby ensuring in-order assignment of the streaming file segments;

(d) acquire timestamp information from the streaming file segments in a first one of the time windows, the timestamp information of the streaming file segments comprising at least one of a timestamp associated with each file segment or a timestamp associated with each record in each file segment;

(e) time order the records of the streaming file segments in the first one of the time windows based at least in part on the acquired timestamp information;

(f) acquire data of each record in each file segment; and (g) analyze and validate read eligibility of the acquired data based at least in part on the timestamp associated therewith and a maximum ordering error among pixels.

7. The system of claim 6, further comprising an exporter configured to (i) assemble the records into at least one of the streaming file segments and (ii) export the streaming file segments to the collector.

8. The system of claim 6, wherein the collector is further configured to subsequently repeat steps (c)-(e) for a second one of the time windows.

9. The system of claim 6, wherein the collector is further configured to determine a sync-wait time, wherein the read eligibility of the acquired data records is validated based at least in part on the sync-wait time.

10. The system of claim 6, wherein the collector is further configured to order the time windows based on at least one of the start time or the end time associated therewith.

11. The system of claim 10, wherein the collector is further configured to chronologically sort the streaming file segments based on the acquired timing parameter and assign the sorted streaming file segments into the ordered time windows.

* * * * *